United States Patent
Barzelay (10) Patent No.: US 11,267,110 B2
(45) Date of Patent: Mar. 8, 2022

(54) ZERO DISTANCE TOOL

(71) Applicant: TYM LABS L.L.C., Saddle Brooke, NJ (US)

(72) Inventor: Abraham Barzelay, Paramus, NJ (US)

(*) Notice: Subject to any disclaimer, the term of this patent is extended or adjusted under 35 U.S.C. 154(b) by 225 days.

(21) Appl. No.: 15/666,798

(22) Filed: Aug. 2, 2017

(65) Prior Publication Data
US 2019/0039215 A1 Feb. 7, 2019

(51) Int. Cl.
| | | |
|---|---|---|
| B25B 23/10 | (2006.01) | |
| B25B 21/02 | (2006.01) | |
| B23P 19/06 | (2006.01) | |
| B25B 13/48 | (2006.01) | |
| B25B 17/00 | (2006.01) | |
| B25B 23/00 | (2006.01) | |
| B25B 17/02 | (2006.01) | |

(52) U.S. Cl.
CPC ............ B25B 23/108 (2013.01); B23P 19/06 (2013.01); B25B 13/481 (2013.01); B25B 17/00 (2013.01); B25B 17/02 (2013.01); B25B 21/02 (2013.01); B25B 23/00 (2013.01)

(58) Field of Classification Search
CPC ....... B25B 23/108; B25B 23/00; B25B 21/02; B25B 13/481; B25B 17/00; B25B 17/02; B23P 19/06
USPC ........................................................ 81/57.3
See application file for complete search history.

(56) References Cited

U.S. PATENT DOCUMENTS

| | | | | |
|---|---|---|---|---|
| 856,498 | A | * 6/1907 | Tatge | ................... B25B 17/00 81/57.3 |
| 1,327,991 | A | * 1/1920 | Gatewood | ............... B25B 17/00 81/57.3 |
| 1,823,426 | A | * 9/1931 | Ferris | ..................... B23B 31/28 81/57.31 |
| 1,970,721 | A | 8/1934 | Walton | |
| 2,477,528 | A | 7/1949 | Schrader | |
| 2,481,578 | A | * 9/1949 | Dixon | ..................... B25B 21/00 192/3.51 |
| 2,510,483 | A | 6/1950 | Schnepel | |
| 2,578,686 | A | 12/1951 | Fish | |
| 2,719,446 | A | * 10/1955 | Ford | ..................... B25B 21/004 81/57.13 |
| 2,740,507 | A | 4/1956 | Shaff | |
| 2,756,792 | A | 7/1956 | Hirschman | |
| 2,764,050 | A | 9/1956 | Leibowitz | |
| 2,808,749 | A | 10/1957 | Lampke | |
| 2,881,884 | A | 4/1959 | Amtsberg | |
| 2,884,826 | A | 5/1959 | Bruhn | |

(Continued)

FOREIGN PATENT DOCUMENTS

| | | |
|---|---|---|
| CN | 204868664 | 12/2015 |
| WO | WO 2005073122 | 8/2005 |

OTHER PUBLICATIONS

U.S. Appl. No. 15/488,016, of Abraham Barzelay, titled "Torque Wrench Having Impact Engager," filed on Apr. 14, 2017.

(Continued)

*Primary Examiner* — Hadi Shakeri (57) ABSTRACT

A zero distance tool for turning a fastener is disclosed. The tool may have a driver configured to receive a torsional input. The tool may also have an adapter rotatably coupled to the driver. The adapter may be configured to engage with a fastener. The tool may have a housing configured to enclose the driver and the adapter.

18 Claims, 8 Drawing Sheets

(56) References Cited

U.S. PATENT DOCUMENTS

| | | | | |
|---|---|---|---|---|
| 3,174,597 | A | 3/1965 | Schaedler | |
| 3,373,639 | A | 3/1968 | Dalen | |
| 3,472,083 | A | 10/1969 | Schnepel | |
| 3,491,839 | A | 1/1970 | McIntire | |
| 3,605,914 | A | 9/1971 | Kramer | |
| 3,661,217 | A | 5/1972 | Maurer | |
| 3,724,299 | A | 4/1973 | Nelson | |
| 3,861,244 | A | 1/1975 | MacDonald | |
| 3,866,492 | A | 2/1975 | Knoll | |
| 3,921,474 | A | 11/1975 | Dyck et al. | |
| 3,979,965 | A | 9/1976 | Vuceta | |
| 4,043,228 | A | 8/1977 | Venezio | |
| 4,063,601 | A | 12/1977 | Biek | |
| 4,213,333 | A | 7/1980 | Krieger | |
| 4,258,595 | A * | 3/1981 | Ramsey | B25B 13/463 81/61 |
| 4,362,072 | A | 12/1982 | Tillman | |
| 4,374,480 | A | 2/1983 | Diaz | |
| 4,426,895 | A | 1/1984 | Lack | |
| 4,532,832 | A | 8/1985 | Christensen | |
| 4,535,653 | A | 8/1985 | Coburn | |
| 4,573,377 | A * | 3/1986 | Sroka | B25B 17/00 81/57.2 |
| 4,627,310 | A | 12/1986 | Coburn | |
| 4,720,000 | A | 1/1988 | Snyder | |
| 4,827,809 | A | 5/1989 | Broemel, Jr. | |
| 4,827,810 | A | 5/1989 | Rushanan | |
| 4,911,040 | A | 3/1990 | Kim | |
| 4,919,022 | A | 4/1990 | Ono | |
| 4,928,558 | A * | 5/1990 | Makhlouf | B25B 13/481 81/57.13 |
| 5,123,310 | A | 6/1992 | McManus | |
| 5,125,297 | A | 6/1992 | Bai | |
| 5,176,047 | A | 1/1993 | Bai | |
| 5,213,015 | A | 5/1993 | Disston | |
| 5,305,670 | A | 4/1994 | Fossella | |
| 5,375,489 | A | 12/1994 | McClure | |
| 5,501,107 | A | 3/1996 | Snyder | |
| 5,553,520 | A | 9/1996 | Jacobs | |
| 5,609,077 | A * | 3/1997 | Ohmi | B25B 13/481 81/57.13 |
| 5,709,136 | A | 1/1998 | Frenkel | |
| 5,918,511 | A | 7/1999 | Sabbaghian | |
| 6,047,616 | A * | 4/2000 | Ochiai | B25B 13/467 81/57.13 |
| 6,073,522 | A | 6/2000 | Carnesi | |
| 6,165,096 | A | 12/2000 | Seith | |
| 6,202,516 | B1 | 3/2001 | Kim | |
| 6,223,630 | B1 | 5/2001 | Stanton | |
| 6,305,236 | B1 | 10/2001 | Studevant | |
| 6,401,572 | B1 | 6/2002 | Provost | |
| 6,668,685 | B2 * | 12/2003 | Boston | B23P 19/069 81/57.22 |
| 6,715,380 | B2 | 4/2004 | Listl | |
| 6,923,094 | B1 | 8/2005 | Marquardt | |
| 7,530,253 | B2 | 5/2009 | Spenser | |
| 8,584,554 | B2 | 11/2013 | Chen | |
| 8,695,462 | B1 | 4/2014 | Jorgensen | |
| 8,893,592 | B2 | 11/2014 | Womack | |
| 9,095,960 | B2 | 8/2015 | Kim | |
| 9,205,542 | B2 * | 12/2015 | Dedrickson | B25B 21/004 |
| 9,583,904 | B2 | 2/2017 | Battenfield | |
| 9,592,591 | B2 | 3/2017 | McClung | |
| 9,592,593 | B2 | 3/2017 | Chen | |
| 9,737,978 | B2 | 8/2017 | Golden | |
| 9,757,232 | B2 | 9/2017 | Peterson | |
| 2002/0035876 | A1 | 3/2002 | Donaldson, Jr. | |
| 2002/0096020 | A1 | 7/2002 | Hart | |
| 2004/0093990 | A1 | 4/2004 | Wojtynek | |
| 2005/0039579 | A1 | 2/2005 | Wallace | |
| 2005/0183548 | A1 | 8/2005 | Horobec | |
| 2006/0096421 | A1 | 5/2006 | Wexler | |
| 2006/0107798 | A1 | 5/2006 | Falzone | |
| 2006/0283265 | A1 | 12/2006 | Izumisawa | |
| 2007/0251359 | A1 | 11/2007 | Junkers | |
| 2008/0098856 | A1 | 5/2008 | Ha | |
| 2008/0282846 | A1 | 11/2008 | Sharifi-Mehr | |
| 2009/0014192 | A1 | 1/2009 | Ito | |
| 2009/0309282 | A1 | 12/2009 | Wang | |
| 2010/0064864 | A1 * | 3/2010 | Kobayashi | B25B 21/02 81/464 |
| 2011/0036206 | A1 | 2/2011 | Yang | |
| 2011/0056337 | A1 | 3/2011 | Buchanan | |
| 2012/0103142 | A1 | 5/2012 | Sroka | |
| 2012/0297939 | A1 | 11/2012 | Spata | |
| 2013/0062090 | A1 | 3/2013 | Winnard | |
| 2013/0233131 | A1 * | 9/2013 | Badiali | B25B 21/007 81/57.3 |
| 2014/0053693 | A1 | 2/2014 | Womack | |
| 2015/0033917 | A1 | 2/2015 | Chen | |
| 2015/0174741 | A1 | 6/2015 | Frank | |
| 2015/0273667 | A1 * | 10/2015 | Hielscher | B25B 13/08 81/57.22 |
| 2017/0001289 | A1 | 1/2017 | Soderlund | |
| 2017/0197300 | A1 | 7/2017 | Lin | |
| 2018/0043515 | A1 | 2/2018 | Zelniker | |

OTHER PUBLICATIONS

U.S. Appl. No. 15/488,097, of Abraham Barzelay, titled "Torque Wrench Having Self-Adjusting Adapter," filed on Apr. 26, 2017.

U.S. Appl. No. 15/469,160, of Abraham Barzelay, titled "Continuous Rotation Torque Wrench," filed on Apr. 20, 2017.

U.S. Appl. No. 15/488,124, of Abraham Barzelay, titled "Torque Wrench Having Self-Adjusting Adapter," filed on Apr. 26, 2017.

* cited by examiner

ZERO DISTANCE TOOL

TECHNICAL FIELD

The present disclosure relates generally to a zero distance tool, and, more particularly, to a zero distance tool capable of turning a fastener that is separated from an adjacent wall by a very small distance.

BACKGROUND

A torque wrench is a tool designed to exert torque on a fastener (e.g., on a bolt head or nut having specially designed inner and/or outer surfaces) to loosen or tighten the fastener. In some embodiments, the torque wrench is powered. For example, the torque wrench can be hydraulically, pneumatically, or electrically powered. In other examples, the torque wrench is manually manipulated.

Conventional torque wrenches connect to a fastener via an adapter. For example, a hexagonal socket having an internal diameter corresponding to an external diameter of the fastener is temporarily connected to the torque wrench and then placed over the fastener. The hexagonal socket is configured to internally receive the head of the fastener and inhibit relative movement of the fastener during the application of torque by the wrench. Sockets are available in many different sizes to accommodate different sizes of fasteners.

Conventional hexagonal sockets, however, may not be usable for turning fasteners in applications in which the fasteners are positioned near an end wall. For example, it may not be possible for a conventional hexagonal socket to be placed over the head of a fastener separated from an adjacent wall by a very small distance (e.g. less than 2 mm), because of the thickness of the walls of the socket itself. A conventional hexagonal socket may also be unsuitable in applications where adjacent fasteners are disposed close to each other making it difficult to insert the socket between adjacent fasteners. Moreover, even if the socket can be placed over the fastener, the close proximity of adjacent fasteners or the proximity of the fastener to a wall may limit an amount by which the fastener may be rotated in each rotational cycle (i.e. without repositioning the socket or wrench). In certain applications, for example, large diameter overland or underwater pipes, adjacent pipe sections are often connected together using several tens if not hundreds of fasteners. The limitation on the amount of rotation of the fastener during each rotation cycle may significantly increase the amount of time required to attach or remove fasteners from such equipment.

The zero distance tool of the present disclosure solves one or more of the problems set forth above and/or other problems in the art.

SUMMARY

In one aspect, the present disclosure is directed to a zero distance tool. The tool may include a driver configured to receive a torsional input. The tool may also include an adapter rotatably coupled to the driver. The adapter may be configured to engage with a fastener. The tool may include a housing configured to enclose the driver and the adapter. The zero distance tool is capable of turning a fastener that is separated from an adjacent wall by a small distance, such as a distance of less than 2 mm.

In another aspect, the present disclosure is directed to a torque assembly. The torque assembly may include a wrench. The torque assembly may also include a zero distance tool connected to the wrench. The zero distance tool may include a main gear configured to receive a torsional input from the wrench. The zero distance tool may also include a sector gear coupled to the main gear. The sector gear may be configured to engage with a fastener. The zero distance tool may further include a housing configured to enclose the main gear and the sector gear.

In yet another aspect, the present disclosure is directed to method of rotating a fastener. The method may include engaging an adapter of a zero distance tool with the fastener. The method may also include connecting a wrench to a driver of the zero distance tool. The driver may be coupled to the adapter and may be configured to rotate the adapter. The method may further include providing a rotational input, using the wrench, to the driver. The method may include rotating the adapter by a predetermined angle in a first direction during a first rotational cycle. The method may also include repositioning the adapter without rotating the driver. In addition, the method may include rotating the adapter in the first direction during a second rotational cycle after repositioning the adapter.

DETAILED DESCRIPTION

Figure 1:
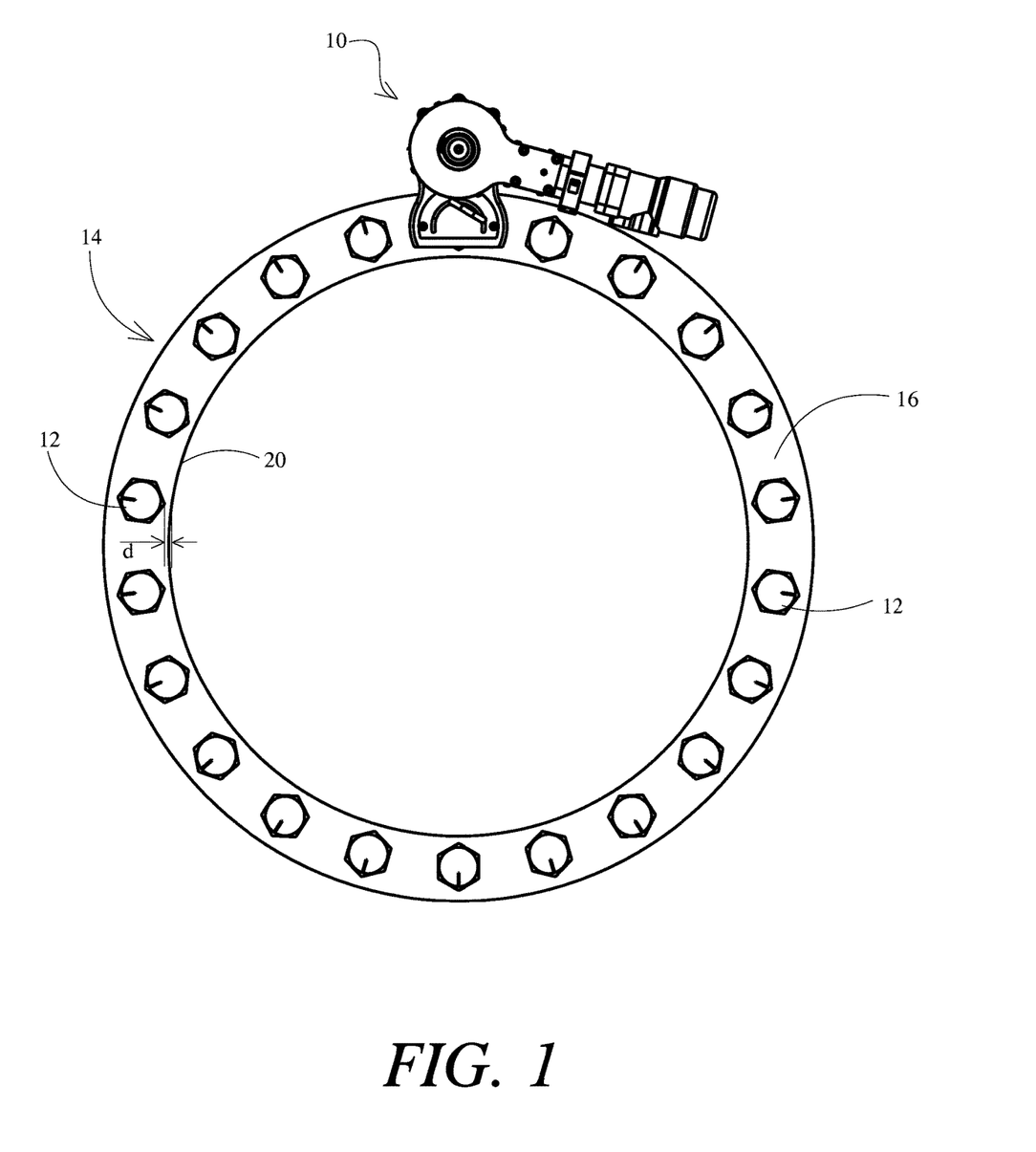
FIG. 1 is a diagrammatic illustration of an exemplary disclosed torque assembly attached to a fastener.

FIG. 1 illustrates an exemplary torque assembly 10 attached to fastener 12 of component assembly 14. In one exemplary embodiment as illustrated in FIG. 1, component assembly 14 may be a pipe assembly. Component assembly 14 may include fasteners 12 that may attach flange 16 with another flange (not shown). Component assembly 14 may include any number of fasteners 12. In one exemplary embodiment, Component assembly 14 may include several tens or hundreds of fasteners 12. Fasteners 12 may be spaced uniformly or non-uniformly on flange 16. In one exemplary embodiment as illustrated in FIG. 1, fasteners 12 may be positioned on flange 16 so that a smallest distance "d" between a fastener 12 and wall 20 may be smaller than a wall thickness of a conventional hexagonal socket. In some exemplary embodiments, distance d may range from about 0.5 mm to about 2 mm. It is contemplated, however, that torque assembly 10 may also be used to turn fasteners 12 on component assembly 14 in which the distance d may be large enough to accommodate a conventional hexagonal socket. As used in this disclosure the term about should be interpreted as encompassing typical machining or manufacturing tolerances. Thus, for example, the phrase "about 0.5 mm" may represent a range of dimensions between 0.5 mm±0.1 mm, although smaller or larger manufacturing tolerances are also contemplated. Similarly, for example, the phrase "about 30°" may represent a range of angles between 30°±1°, although smaller or larger manufacturing tolerances are also contemplated. Although component assembly 14 has been illustrated and described as pipe assembly, it is contemplated that component assembly 14 may include any type of assembly that uses fasteners to connect two or more components.

Figure 2:
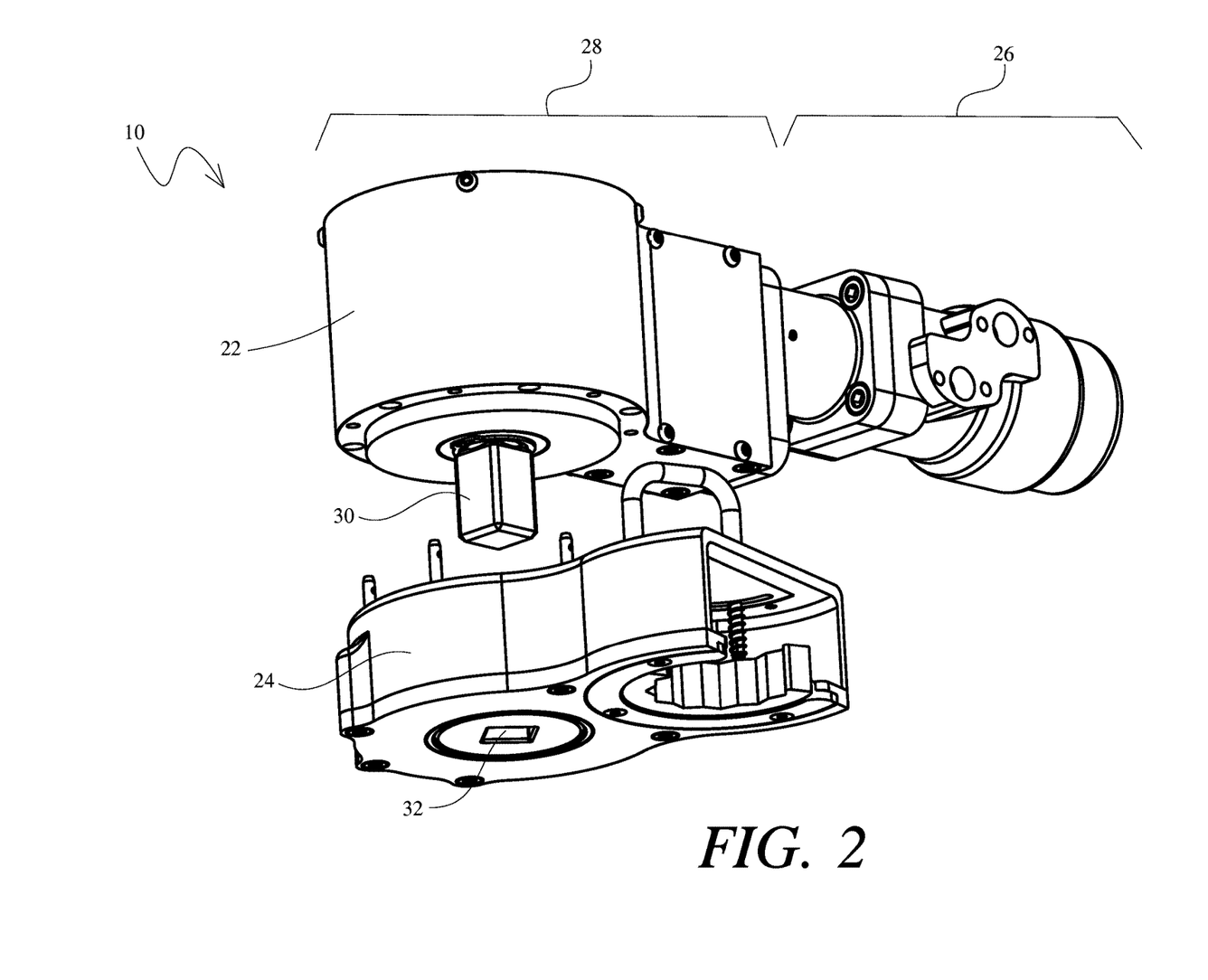
FIG. 2 is a partially exploded view illustration of the exemplary torque assembly of FIG. 1.

FIG. 2 illustrates a partially exploded view of an exemplary torque assembly 10. Torque assembly 10 may include wrench 22 and zero distance tool 24. In one exemplary embodiment as illustrated in FIG. 2, wrench 22 may be a torque wrench that can be used to tighten or loosen a fastener (see FIG. 1) by, for example, turning the fastener in a clockwise or counterclockwise direction, respectively. Wrench 22 may include wrench input end 26 and wrench output end 28. Wrench input end 26 may be configured to receive a torsional input (e.g., from a manually operated lever or from an electric, hydraulic, or pneumatic motor), which may be transformed into a torsional output at wrench output end 28. Wrench output end 28 may include driver shaft 30, which may engage with hole 32 of zero distance tool 24. Driver shaft 30 may transfer the torsional output from wrench output end 28 to zero distance tool 24. Although wrench 22 has been referred to as a torque wrench, it is contemplated that wrench 22 may be any type of conventional wrench capable of engaging with zero distance tool 24 to provide a rotational input to zero distance tool 24. For example, wrench 22 may be a manually operated wrench, or a pneumatically, electrically, or hydraulically operated wrench. In one exemplary embodiment, wrench 22 may be configured to generate and exert impact forces on the fastener. In other exemplary embodiments, wrench 22 may be a torque wrench as described in one or more of U.S. application Ser. Nos. 15/488,016; 15/488,097; 15/469,160; and 15/488,124, all of which are incorporated herein by reference.

Figure 3:
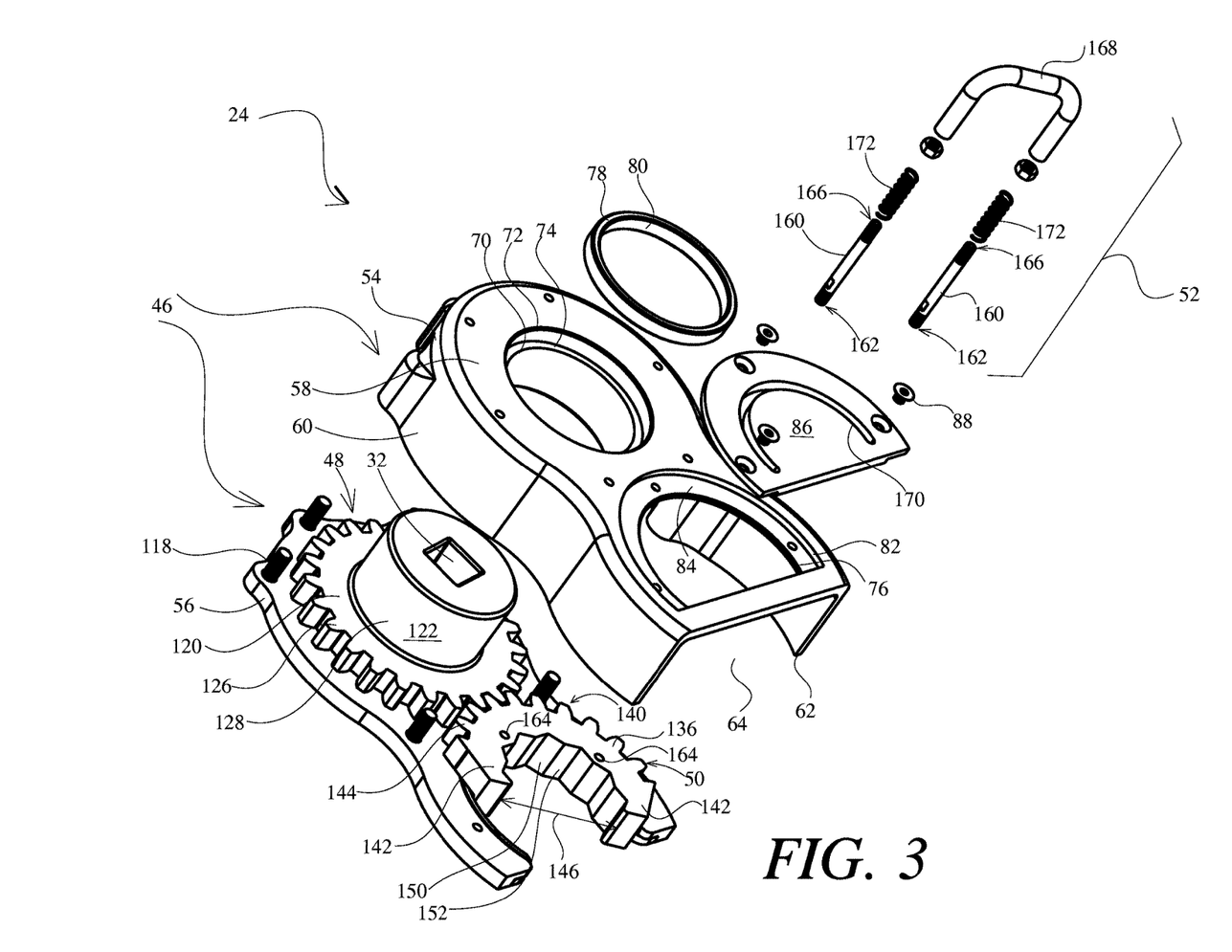
FIG. 3 is an exploded view illustration of an exemplary zero distance tool that may form a portion of the torque assembly of FIG. 2.
Figure 4:
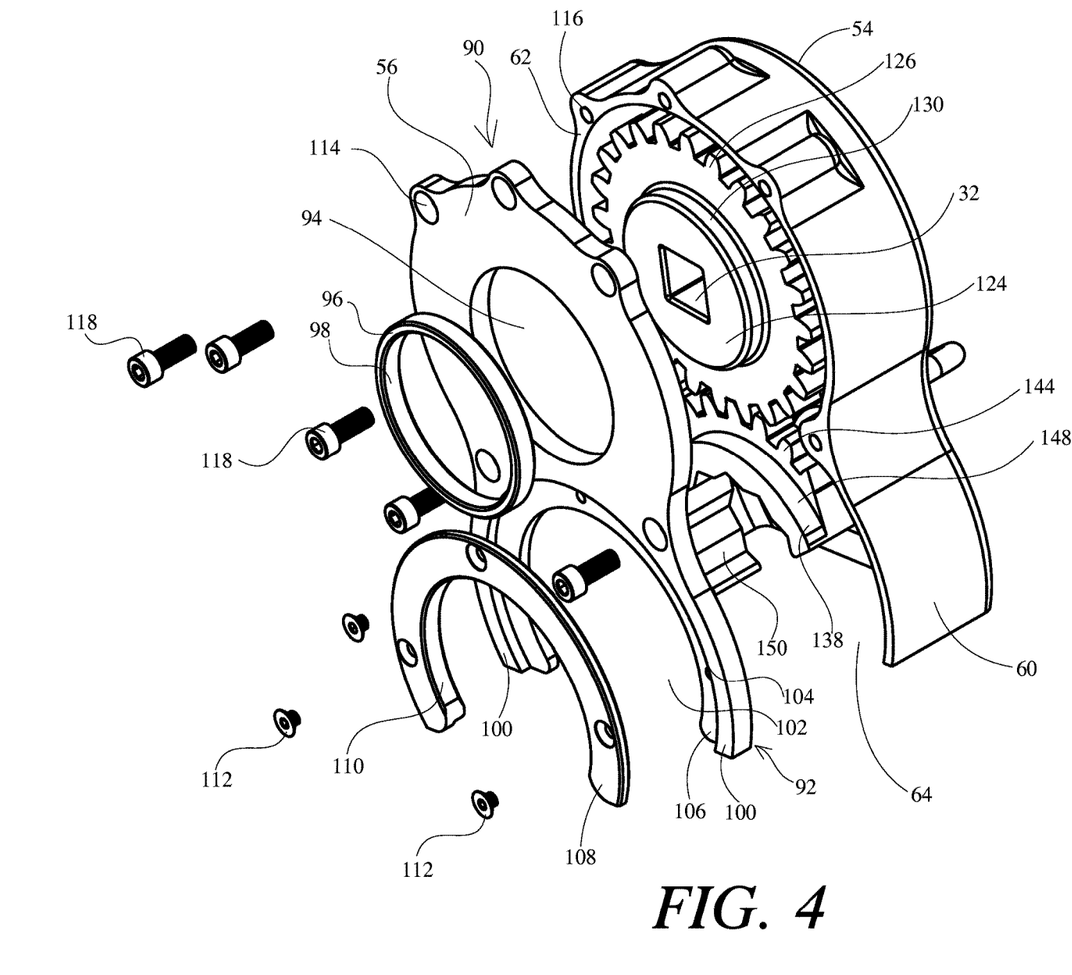
FIG. 4 is another exploded view illustration of the exemplary zero distance tool of FIG. 3.

FIGS. 3 and 4 illustrate exploded views of an exemplary zero distance tool 24. As illustrated in FIG. 3, zero distance tool 24 may include housing 46, main gear 48, sector gear 50, and handle 52. Housing 46 may enclose main gear 48 and sector gear 50. Housing 46 may include top cover 54 and bottom plate 56. The terms "top" and "bottom" as used in this disclosure do not represent relative vertical positions but instead are used to distinguish two components, for example, of housing 46.

Top cover 54 may include face plate 58 and side wall 60, which may project from face plate 58 to wall end face 62. Face plate 58 and side wall 60 may define an enclosure within which main gear 48 and sector gear 50 may be received. Side wall 60 may be arranged along three sides of face plate 58, leaving an open end 64, which may allow zero distance tool 24 to be attached to fastener 12. In one exemplary embodiment as illustrated in FIG. 3, side wall 60 may be generally perpendicular to face plate 58, although it is contemplated that side wall 60 may be disposed at any inclination relative to face plate 58. As used in this disclosure the term "generally" should be interpreted to encompass typical manufacturing tolerances. Thus, for example, the phrase "generally perpendicular" should be understood to encompass angles in the range of about 90°±about 1°.

Figure 5A:
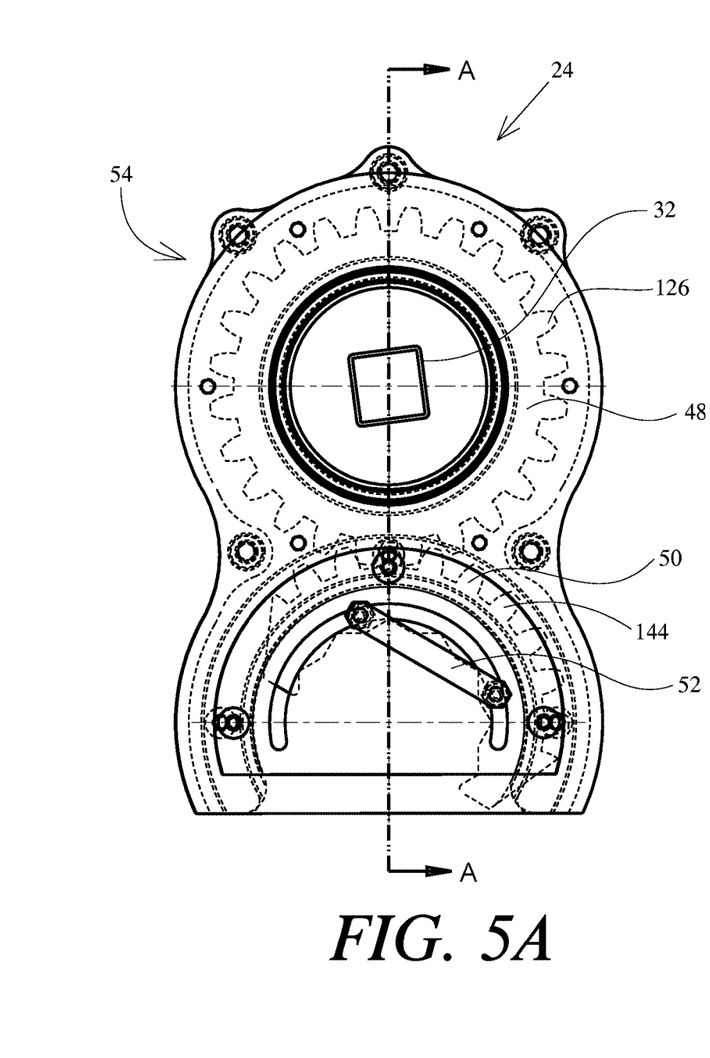
FIG. 5A is a plan view illustration of the exemplary zero distance tool of FIGS. 3 and 4.
Figure 5B:
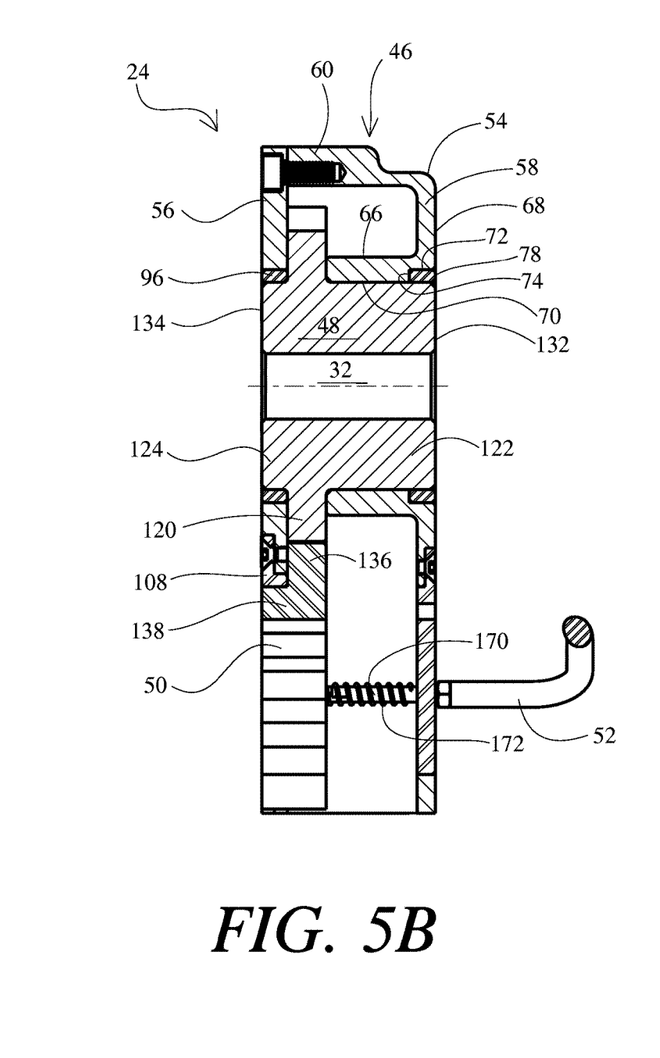
FIG. 5B is a cross-sectional view illustration of the exemplary zero distance tool of FIGS. 3 and 4 along a plane AA.

FIG. 5A illustrates a plan view of an exemplary zero distance tool 24. FIG. 5B illustrates a cross-sectional view of zero distance tool 24 along a plane AA. As illustrated in FIG. 5B, top cover 54 may include a hollow generally tubular extension 66, which extends from outer surface 68 of face plate 58, through housing 46, and towards bottom plate 56. Extension 66 may include bore 70 and counterbore 72, which may extend from outer surface 68 to ledge 74 disposed between outer surface 68 and bottom plate 56. As illustrated in FIG. 5B, counterbore 72 may have a diameter which may be larger than a diameter of bore 70.

Returning to FIG. 3, face plate 58 of top cover 54 may include opening 76 laterally spaced apart from bore 70. Compared to bore 70, opening 76 may be positioned nearer open end 64. In one exemplary embodiment as illustrated in FIG. 3, opening 76 may have a generally semi-circular shape. Opening 76 may include counterbore 82, which may have a radius larger than a radius of opening 76. Counterbore 82 and opening 76 may form ledge 84.

First main gear bushing 78 may be received in bore 70 and may abut on ledge 74 (see FIG. 5B). As illustrated in FIG. 3, first main gear bushing 78 may have a generally annular shape with generally cylindrical inner surface 80. In one exemplary embodiment, first main gear bushing 78 may be attached to top cover 54 via an interference fit. It is also contemplated, however, that first main gear bushing 78 may be attached to top cover 54 via one or more fasteners. In some exemplary embodiments, first main gear bushing 78 may be slidingly received in bore 70.

First sector gear bushing 86 may be received within counterbore 82 and may abut on ledge 84. First sector gear bushing 86 may be removably attached to ledge 84 via one or more fasteners 88. First sector gear bushing 86 may form a portion of housing 46 in the form of a cover plate that may cover opening 76.

Bottom plate 56 may be planar and may have a generally uniform thickness. As illustrated in FIG. 4, bottom plate 56 of housing 46 may include main gear portion 90 and sector gear portion 92. Main gear portion 90 of bottom plate 56 may include opening 94, which may be disposed generally concentric with bore 70 and counterbore 72. Opening 94 may be configured to receive second main gear bushing 96 (see FIG. 5B). As illustrated in FIG. 4, second main gear bushing 96 may have a generally annular shape with a generally cylindrical inner surface 98. In one exemplary embodiment, second main gear bushing 96 may be attached to bottom plate 56 via an interference fit. It is also contemplated, however, that second main gear bushing 96 may be attached to bottom plate 56 via fasteners. In some exemplary embodiments, second main gear bushing 96 may be slidingly received within opening 94 of bottom plate 56.

Sector gear portion 92 of bottom plate 56 may include legs 100 projecting from main gear portion 90. Legs 100 may be spaced apart from each other and may be shaped to create a generally semi-circular opening 102, which may be bounded on three sides by main gear portion 90 and legs 100. Opening 102 may include counterbore 104, which may have a radius larger than a radius of opening 102. Counterbore 104 may include ledge 106. Second sector gear bushing 108 may be received within counterbore 104 and may abut on ledge 106. Second sector gear bushing 108 may have an inner surface 110. Second sector gear bushing 108 may be removably attached to ledge 106 via one or more fasteners 112.

Bottom plate 56 may have one or more through holes 114. Top cover 54 may include one or more threaded holes 116 disposed in side wall 60. Bottom plate 56 may be attached to top cover 54 via one or more fasteners 118, which may pass through holes 114 to engage with threads in holes 116.

It is also contemplated, however, that bottom plate 56 may be attached to top cover 54 via other methods of fastening. For example, it is contemplated that fasteners 118 may pass through both holes 114 and 116 and may engage with nuts (not shown) dispose on face plate 58. Alternatively, holes 116 may be through holes and holes 114 may be threaded to allow fasteners 118 to pass through holes 116 and engage with threads in holes 114 to attach bottom plate 56 to top cover 54.

Returning to FIG. 3, main gear 48 may also be referred to as a driver of zero distance tool 24. For example, main gear 48 may be configured to receive a rotational input from wrench 22 and may drive (i.e. rotate) sector gear 50. Main gear 48 may include gear portion 120 and journal portions 122 and 124 (see FIG. 4). As illustrated in FIG. 3, gear portion 120 may be disposed between journal portions 122 and 124, which may project on opposite sides of gear portion 120. Gear portion 120 may include a plurality of circumferentially disposed teeth 126. In one exemplary embodiment as illustrated in FIG. 3, teeth 126 may be disposed uniformly spaced around a circumference of gear portion 120. Journal portion 122 of main gear 48 may have a generally cylindrical outer surface 128. Journal portion 122 may be rotatingly received within first main gear bushing 78 so that outer surface 128 may slidingly engage with inner surface 80 of first main gear bushing 78.

As illustrated in FIG. 4, journal portion 124 of main gear 48 may have a generally cylindrical outer surface 130. Journal portion 124 may be rotatingly received within second main gear bushing 96 so that outer surface 130 may slidingly engage with inner surface 98 of second main gear bushing 96. As illustrated in FIG. 5B, main gear 48 may have a thickness about equal to a thickness of housing 46. As also illustrated in FIG. 5B, journal portions 122 and 124 may allow main gear 48 to rotate while being enclosed by top cover 54 and bottom plate 56 of housing 46.

Main gear 48 may include hole 32. In one exemplary embodiment as illustrated in FIG. 5B, hole 32 may be a through hole, extending from front face 132 of journal portion 122 to rear face 134 of journal portion 124, traversing an entire thickness of main gear 48. The terms "front," "rear," "top," and "bottom" as used in this disclosure do not represent relative positions along any direction but instead are used to distinguish opposing sides of a component. It is also contemplated that in some exemplary embodiments, hole 32 may not be a through hole, but instead may extend from front face 132 of journal portion 122 partway to a position between front face 132 and rear face 134. Hole 32 may have a shape that may be suitable for mating with driver shaft 30 of wrench 22. In one exemplary embodiment as illustrated in FIG. 5A, hole 32 may have a generally square or rectangular cross-section to match with a corresponding square or rectangular cross-section of driver shaft 30, although other shapes of driver shaft 30 and hole 32 are also contemplated. Driver shaft 30 may engage with hole 32 to impart rotational motion from wrench output end 28 to main gear 48.

Returning to FIG. 3, sector gear 50 may be referred to as an adapter and may be configured to be rotated by main gear 48. Sector gear 50 (or adapter) may include gear portion 136 and journal portion 138 (see FIGS. 4, 5B). As illustrated in FIG. 5B, gear portion 136 of sector gear 50 may have a thickness about equal to a thickness of gear portion 120 of main gear 48. As illustrated in FIG. 3, gear portion 136 may include closed end 140 and open end 142 disposed opposite closed end 140. Closed end 140 may form a generally arcuate section, which may be shaped like a sector of an annular ring. Arcuate section 140 may have an angular span of less than about 90°. In some exemplary embodiments, arcuate section 140 may span an angle ranging between about 60° and about 75°. Arcuate section 140 may include a plurality of teeth 144 disposed over a circumferential portion spanned by arcuate section 140. One or more teeth 144 of sector gear 50 may engage with one or more teeth 126 of main gear 48. Because arcuate section 140 forms only a part of a complete annular cylinder, main gear 48 may rotate sector gear 50 by an angle of rotation about equal to or less than to an angular span of sector gear 50. In some exemplary embodiments, main gear 48 may rotate sector gear 50 by an angle of rotation ranging between about 30° to about 60°.

Prongs 146 may be spaced apart from each other and may project from opposite ends of arcuate section 140. The spacing between prongs 146 may define open end 142 of sector gear 50. Open end 142 of sector gear 50 may be disposed adjacent open end 64 of top cover 54.

As illustrated in FIG. 4, journal portion 138 of sector gear 50 may have a generally cylindrical outer surface 148. Journal portion 138 may be rotatingly received within second sector gear bushing 108 so that outer surface 148 of journal portion 138 may slidingly engage with inner surface 110 of second sector gear bushing 108. Thus, journal portion 138 may allow sector gear 50 to rotate while being enclosed by top cover 54 and bottom plate 56 of housing 46.

As also illustrated in FIG. 3, sector gear 50 may include inner surface 150, which may include a plurality of notches 152. In one exemplary embodiment as illustrated in FIG. 3, notches 152 may have a generally triangular or saw-tooth shape, although other shapes are also contemplated. The spacing between prongs 146, a size of open end 142, and/or a number of notches 152 may be selectable so that zero distance tool 24 may be used to turn fasteners 12 of any size. Sector gear 50 may have a thickness smaller than a thickness of main gear 48 (see FIG. 5B). As also illustrated in FIG. 5B, a thickness of sector gear 50 may be smaller than a thickness of housing 46.

Figure 6:
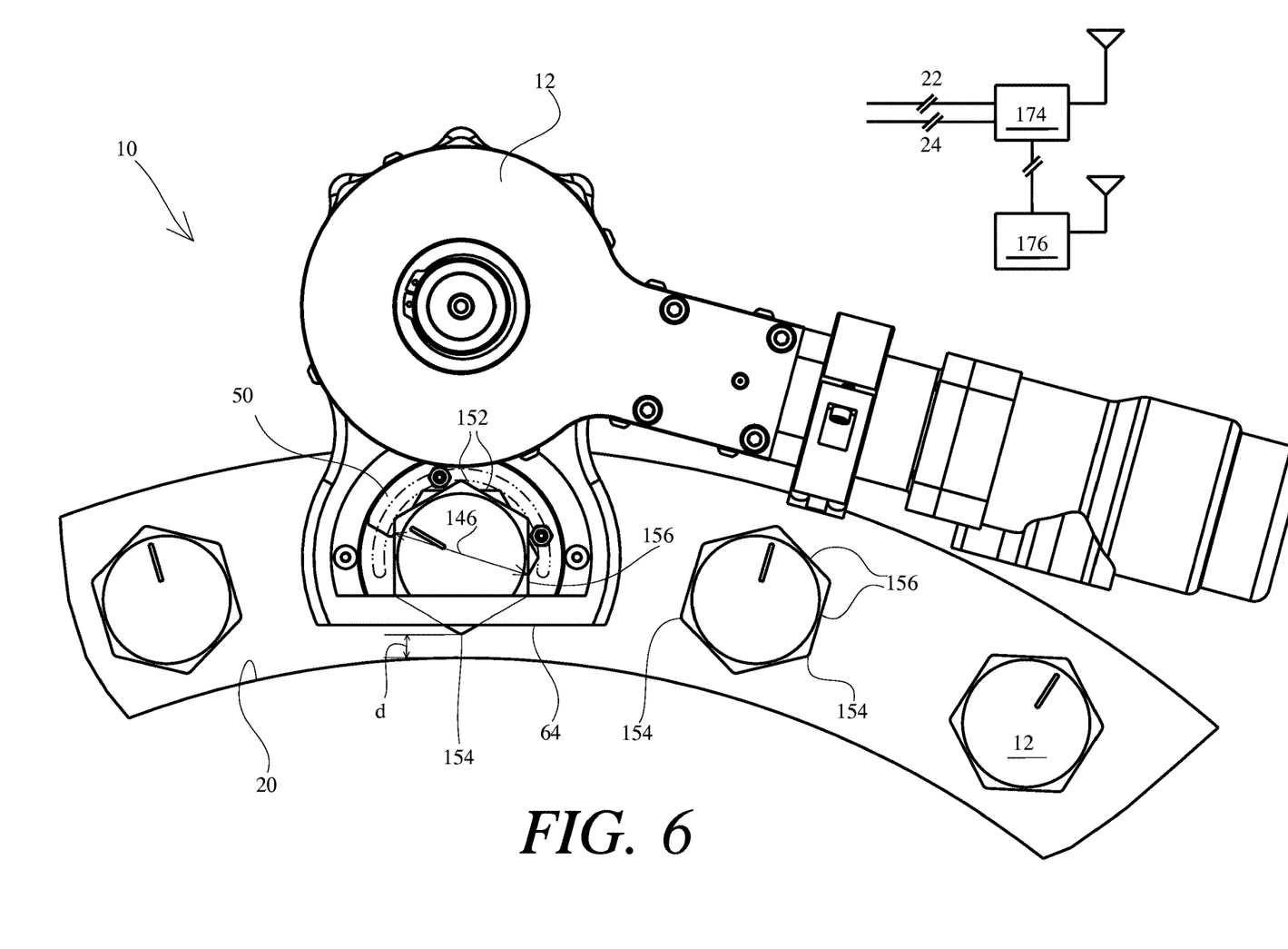
FIG. 6 is a magnified illustration of the exemplary disclosed torque assembly of FIG. 2, attached to a fastener.

FIG. 6 illustrates a magnified view of torque assembly 10 attached to a fastener 12. As illustrated in FIG. 6, one or more notches 152 may help sector gear 50 engage with one or more corners 154 or one or more sides 156 of fastener 12. Open end 64 and open end 146 may allow zero distance tool 24 to be attached to fastener 12 even when distance d between corner 154 of fastener 12 and wall 20 of component assembly 14 may be very small, for example, smaller than a wall thickness of a conventional socket. This is because, unlike a conventional socket it is necessary for only one or more notches 152 of sector gear 50 to engage with one or more corners 154 of fastener 12 to be able to turn fastener 12. Moreover, the open socket configuration of zero distance tool 24, resulting from the presence of open end 142 between prongs 146, may allow zero distance tool 24 to be placed in close proximity to wall 20 of component assembly 14 without the need for inner surface 150 of sector gear 50 to circumscribe fastener 12 as is typically required with the use of conventional sockets.

Returning to FIG. 3, zero distance tool 24 may include handle 52, which may be attached to sector gear 50. In one exemplary embodiment as illustrated in FIG. 3, handle 52 may include a pair of pins 160 disposed spaced apart from each other. Proximal ends 162 of pins 160 may be attached to sector gear 50 at attachment locations 164. Handle bar 168 may be connected to distal ends 166 of pins 160. First sector gear bushing 86 may include slot 170 through which pins 160 may project outward from housing 46. Slot 170 may have a generally semi-circular shape and may be configured to slidingly receive pins 160. Slot 170 may guide pins 160 to move along slot 170, during rotation of sector gear 50. Each pin 160 may be equipped with spring 172, which may be disposed coaxially about pin 160.

As illustrated in FIG. 5B, pins 160 may project from sector gear 50, through housing 46. Each spring 172 may be disposed between sector gear 50 and top cover 54. Pulling on handle bar 168 of handle 52 may allow sector gear 50 to be displaced within housing 46 towards face plate 58 of housing 46, thereby compressing and preloading springs 172. Pulling on handle bar 168 may also disengage teeth 144 of sector gear 50 from teeth 126 of main gear 48. When handle bar 168 is released, preloaded springs 172 may force sector gear 50 to be displaced towards bottom plate 56, causing teeth 144 of sector gear 50 to reengage with teeth 126 of main gear 48. Allowing springs 172 to be preloaded may help sector gear 50 reengage with main gear 48 when zero distance tool 24 may be oriented, for example, in a vertical configuration with the face plate 58 of housing 46 facing towards the ground.

As illustrated in FIG. 6, wrench 22 and/or zero distance tool 24 may be associated with controller 174, which may be used to control operations of wrench 22 and/or zero distance tool 24. Controller 174 may embody a single processor or multiple processors that include a means for controlling an operation of wrench 22 and/or zero distance tool 24. Controller 174 may include one or more general or special purpose processors or microprocessors. Controller 174 may further include or be associated with a memory for storing data such as, for example, design limits, performance characteristics, operational instructions, and corresponding parameters of wrench 22 and/or zero distance tool 24. Various other known electrical circuits and/or actuators may be associated with controller 174, including power supply circuitry, signal-conditioning circuitry, solenoid driver circuitry, communication circuitry, and other appropriate circuitry. Moreover, controller 174 may be capable of communicating with any or all of the components of wrench 22 and/or zero distance tool 24 via wired and/or wireless transmission.

In some applications, controller 174 may be configured to power wrench 22 and to control an amount of torque, or rotational speed provided by driver shaft 30. Controller 174 may also be configured to control an angle of rotation of driver shaft 30 and/or of sector gear 50. Further, controller 174 may be configured to control one or more actuators (not shown) to disengage sector gear 50 from main gear 48, to reposition sector gear 50, and to reengage sector gear 50 with main gear 48. In some exemplary embodiments, a remote control 176 may be configured to provide signals to controller 174 to instruct controller 174 to perform one or more of the operations described above.

Figure 7:
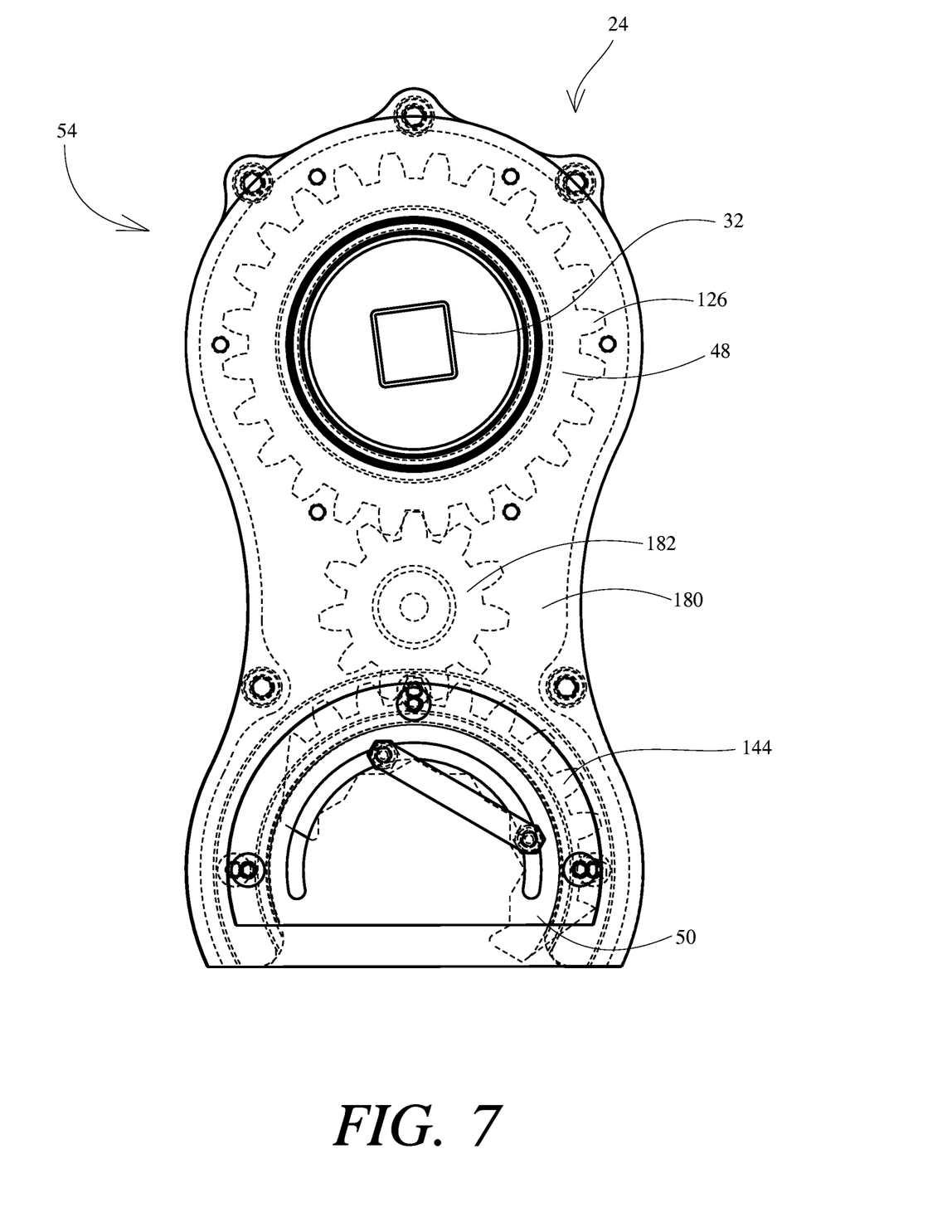
FIG. 7 is a plan view illustration of another exemplary embodiment of the zero distance tool of FIG. 2.

FIG. 7 illustrates another exemplary embodiment of zero distance tool 24. As illustrated in FIG. 7, zero distance tool 24 includes main gear 48 (driver), sector gear 50 (adapter), and gear train 180. Thus, main gear 48 may be indirectly coupled to sector gear 50. For example, as illustrated in FIG. 7, gear train 180 may include intermediate gear 182 that may be disposed between main gear 48 and sector gear 50. Although only one intermediate gear 182 is illustrated in FIG. 7, it is contemplated that gear train 180 may include any number of intermediate gears 182. Gear train 180 and intermediate gear 182 as illustrated in FIG. 7 are exemplary and other types of gear train arrangements are also contemplated. For example, although intermediate gear 182 has been illustrated in FIG. 7 as having an axis of rotation separate from an axis of rotation of main gear 50, it is contemplated that one or more intermediate gears 182 may be disposed on the axis of rotation of main gear 50, while other intermediate gears may have an axis of rotation separate from that of main gear 50. A number of intermediate gears 182, and/or the gear ratios between main gear 48, sector gear 50, and/or one or more of intermediate gears 182 may be selected to deliver a predetermined torque to fastener 12, or to impart a predetermined speed of rotation to sector gear 50. Additionally or alternatively, sizes of main gear 48, sector gear 50, and/or the one or more intermediate gears 182 may be selected to achieve the desired gear ratios, to deliver a predetermined torque to fastener 12, or to impart a predetermined speed of rotation to sector gear 50.

INDUSTRIAL APPLICABILITY

The exemplary disclosed zero distance tool 24 may be used to turn one or more fasteners 12 to tighten or loosen fasteners 12 in any assembly (e.g. component assembly 14) that uses fasteners to attach two components. In particular, zero distance tool 24 may be used to turn fasteners 12 in applications in which a spacing between adjacent fasteners 12 may prevent attachment of a conventional socket to the fasteners. Zero distance tool 24 may also be used to turn fasteners 12 in applications in which at least one corner 154 of fastener 12 may be disposed in close proximity to wall 20 of a component, thereby preventing attachment of a conventional socket to the fasteners. An exemplary method of using zero distance tool 24 to turn fastener 12 is discussed below.

Figure 8:
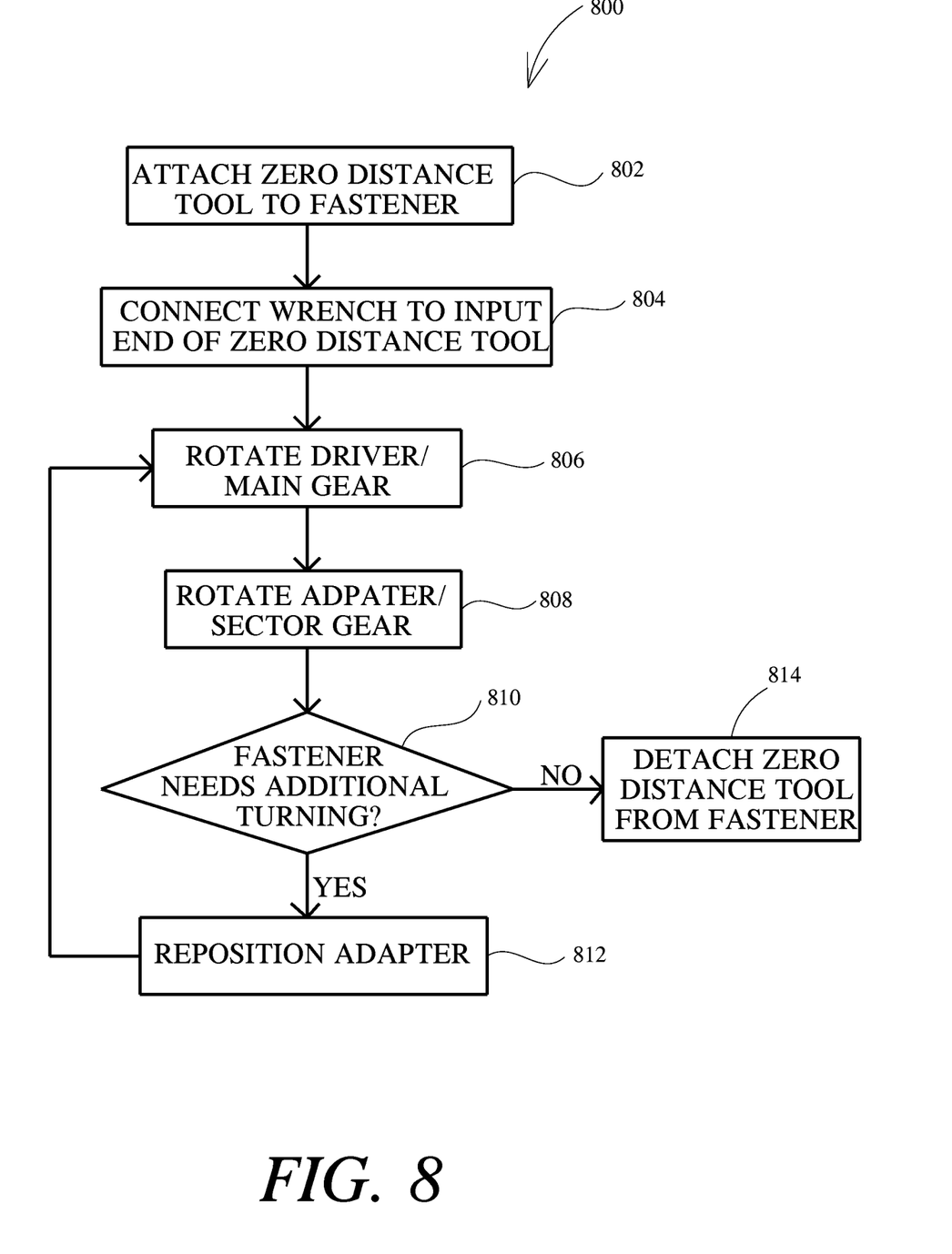
FIG. 8 is a flowchart illustrating an exemplary method of turning a fastener, using the torque assembly of FIG. 2.

FIG. 8 illustrates an exemplary method 800 of turning a fastener using zero distance tool 24 of torque assembly 10. The order and arrangement of steps in method 800 is provided for purposes of illustration. As will be appreciated from this disclosure, modifications may be made to method 800 by, for example, adding, combining, removing, and/or rearranging the steps of method 800.

Method 800 may include a step of attaching zero distance tool 24 to fastener 12 (Step 802). Attaching zero distance tool 24 to fastener 12 may include engaging adapter (e.g. sector gear 50) of zero distance tool 24 with at least one of corner 154 and/or at least one side 156 of fastener 12. In one exemplary embodiment, engaging sector gear 50 may include receiving sides 156 of fastener between prongs 146 of sector gear 50 so that at least one corner 154 engages with notch 152 of sector gear 50 (see e.g., FIG. 6).

Method 800 may further include a step of connecting wrench 22 to driver 48 of zero distance tool 24 (Step 804). Connecting wrench 22 may include, for example, inserting driver shaft 30 into hole 32 of main gear 48. Connecting wrench 22 may also include, for example, attaching an electric, pneumatic, or hydraulic power source to wrench 22 to provide a torsional input to wrench input end 26.

Method 800 may include a step of rotating driver 48 (main gear) of zero distance tool 24 (Step 806). Step 806 may include providing a torsional input to wrench input end 26 of wrench 22, which in turn may rotate wrench output end 28, thereby rotating driver shaft 30. It is to be understood that wrench 22 may be configured to rotate driver shaft 30 in either a clockwise direction or a counterclockwise direction.

Method 800 may include a step of rotating adapter 50 (sector gear) (Step 808). In step 808, adapter (e.g. sector gear 50) may be rotated in a first direction by a predetermined angle, during a first rotational cycle. A rotational cycle as used in this disclosure may represent turning of fastener 12 without repositioning sector gear 50 on fastener 12. Further, the first direction may be either a clockwise direction or a counterclockwise direction. As discussed above, sector gear 50 may span an angle less than about 90°. As a result, rotation of main gear 48 by driver shaft 30 may rotate sector gear 50 until teeth 144 of sector gear 50 disengage from teeth 126 of main gear 48, or until main gear 48 can no longer drive sector gear 50.

In one exemplary embodiment, main gear 48 may be able to rotate sector gear 50 by a predetermined angle ranging between about 30° and about 60° in a rotation cycle. These angles of rotation provided by zero distance tool 24 exceed the amounts of rotation that can be obtained in a rotational cycle with a conventional socket or with a conventional torque wrench. For example, a conventional torque wrench may provide a maximum angle of rotation of about 30°, whereas the disclosed torque assembly 10 may provide angles of rotation ranging between about 30° and about 60° in each rotation cycle. Furthermore, wrench 22 may be configured so that when rotation of wrench 22 is stopped at the end of each rotation cycle, no pneumatic or hydraulic input pressure may be exerted on main gear 48. Additionally, when rotation of wrench 22 is stopped at the end of each rotation cycle, no torsional forces may be exerted on main gear 48, allowing main gear 48 to free wheel (i.e. rotate in both clockwise and counterclockwise directions freely), when sector gear 50 is disengaged from main gear 50.

Method 800 may include a step of determining whether fastener 12 needs additional turning (Step 810). Fastener 12 may need additional turning, for example, when fastener 12 is loose, or when it has not been torqued to a desired torque. When it is determined that fastener 12 requires additional turning (Step 810: Yes), method 800 may proceed to step 812. In step 812 of method 800, sector gear 50 (i.e. adapter) may be repositioned on fastener 12 without rotating driver 48, without repositioning wrench 22, and without removing torque assembly 10 from component assembly 14. Repositioning sector gear 50 may include pulling handle bar 168, which may displace sector gear 50 within housing 46 in a direction towards face plate 58 of top cover 54. Displacing sector gear 50 in this manner may disengage teeth 144 of sector gear 50 from teeth 126 of main gear 48. Pulling handle bar 168 may also compress and thereby preload springs 172.

Repositioning sector gear 50 may include rotating sector gear 50 in a second direction opposite to the first direction of rotation of sector gear 50 caused by main gear 48. Second gear 50 may be rotated in the second direction by an angle that may be the same as or different from the predetermined angle by which sector gear 50 may have been rotated in, for example, step 808. The generally semi-circular slot 170 in housing 46 may guide pins 160 of handle 52 as handle 52 is used to rotate sector gear 50 in the second direction.

Repositioning sector gear 50 may include releasing handle bar 168 to reengage one or more teeth 144 of sector gear 50 with one or more teeth 126 of main gear 48 by. Releasing handle bar 168 may cause preloaded springs 172 to expand, pushing sector gear 50 away from top cover 54 and towards bottom plate 56. Because wrench 22 may allow main gear 48 to free wheel at the end of each rotational cycle, one or more teeth 144 of sector gear 50 may be able to engage with one or more teeth 126 of main gear 48 without the need for accurate alignment between teeth 126 and 144 of main gear 48 and sector gear 50, respectively. After repositioning sector gear 50, method 800 may return to step 806, and steps 806 through 810 of method 800 may be re-executed.

Returning to step 810, when it is determined in step 810, however, that fastener 12 does not require additional turning (Step 810: No), method 800 may proceed to step 814. In step 814, the turning process may end. Step 814 may also include a step of detaching wrench 22 from zero distance tool 24, and of detaching zero distance tool 24 from fastener 12.

Thus by repeatedly performing steps 808-812, zero distance tool 24 may be used to turn fastener 12 in either a clockwise or a counterclockwise direction to a desired torque or by a desired number of rotations. Further, because torque assembly 10 may allow turning fastener 12 by an angle of rotation of up to about 60° in each rotational cycle of fastener 12, torque assembly 10 may help attach or remove fastener 12 in a shorter time period compared to conventional wrench and socket arrangement, which can turn fastener 12 by a maximum angle of rotation of about 30° in each rotational cycle. Moreover, because torque assembly 10 allows main gear 48 to free wheel at the end of each rotational cycle, torque assembly 10 may allow repositioning of sector gear 50 without the need for accurate alignment of teeth 144 of sector gear 50 with teeth 126 of main gear 48. This may in turn reduce the amount of time and effort needed for repositioning sector gear 50 and for turning fastener 12.

It will be apparent to those skilled in the art that various modifications and variations can be made to the disclosed zero distance tool and torque assembly without departing from the scope of the disclosure. Other embodiments of the disclosed zero distance tool and torque assembly will be apparent to those skilled in the art from consideration of the specification and practice of the zero distance tool and torque assembly disclosed herein. It is intended that the specification and examples be considered as exemplary only, with a true scope of the disclosure being indicated by the following claims and their equivalents.

What is claimed is:

1. A zero distance tool, comprising:
    a driver configured to receive a torsional input;
    an adapter rotatably coupled to the driver, the adapter being configured to engage with a fastener;
    a housing configured to enclose the driver and the adapter, and
    a handle extending from the adapter, the handle being adapted to move the adapter from a first position where it is in rotational coupling with the driver to a second position where it is out of rotatable coupling with the driver and out of engagement with the fastener, wherein the handle includes one or more springs that bias the adapter into the first position and wherein in the second position rotation of the handle results in rotation of the adapter relative to the driver, whereby when the adapter has been moved out of rotatable coupling with the driver the adapter is not engageable with the fastener.

2. The zero distance tool of claim 1, wherein the adapter includes:
    a closed end rotatably coupled to the driver; and
    an open end configured to engage with the fastener.

3. The zero distance tool of claim 1, wherein
    the driver includes a main gear, and
    the adapter includes a sector gear configured to be rotated by the main gear.

4. The zero distance tool of claim 3, wherein the sector gear includes:
    a generally arcuate section including a plurality of teeth; and
    a pair of spaced apart prongs extending from opposite ends of the arcuate section.

5. The zero distance tool of claim 4, wherein the sector gear includes an inner surface including at least one notch configured to engage with the fastener.

6. The zero distance tool of claim 4, wherein the prongs are separated by an open end disposed generally diametrically opposite to the arcuate section.

7. The zero distance tool of claim 3, wherein the handle is connected to the sector gear, the handle being configured to:
uncouple the sector gear from the main gear when the bias of the one or more springs is overcome to move the adapter into the second position,
rotate the sector gear relative to the main gear and the fastener, and
reengage the sector gear with the main gear by moving the adapter to the first position.

8. The zero distance tool of claim 7, wherein the handle includes a pair of spaced apart pins connected to the sector gear, the pins projecting from the sector gear to a pair of spaced apart distal ends disposed outside the housing, and a handle bar connected to the distal ends of the pins, wherein the one or more springs comprises a pair of springs disposed coaxially with a respective one of the pins, each of the pair of springs being positioned between the sector gear and the housing.

9. The zero distance tool of claim 8, wherein
the housing includes a slot configured to receive the pins, and
the pins are configured to slidingly travel along a length of the slot during rotation of the sector gear.

10. The zero distance tool of claim 1, further including a gear train operatively connecting the driver and the adapter.

11. The zero distance tool of claim 10, wherein the gear train includes at least one gear selected such that the adapter is configured to apply a predetermined torque to the fastener or to rotate the fastener at a predetermined speed of rotation.

12. A torque assembly, comprising:
a wrench; and
a zero distance tool connected to the wrench, the zero distance tool including:
a main gear configured to receive a torsional input from the wrench;
a sector gear coupled to the main gear, the sector gear being configured to engage with a fastener;
one or more springs connected to the sector gear;
a handle connected to the sector gear, the handle being configured to:
disengage the sector gear from the main gear,
rotate the sector gear relative to the main gear without disconnecting the wrench from the zero distance tool, and
reengage the sector gear with the main gear; and
a housing configured to enclose the main gear and the sector gear,
wherein the sector gear can be uncoupled from the main gear by overcoming a bias of the one or more springs so it can be rotatable relative thereto, and wherein when the sector gear is uncoupled from the main gear it is not engageable with the fastener.

13. The torque assembly of claim 12, wherein the wrench is configured to rotate the sector gear by a predetermined angle during the rotational cycle.

14. The torque assembly of claim 13, wherein the predetermined angle is an angle up to about 60°.

15. The torque assembly of claim 12, wherein the wrench is configured to exert impact forces on the fastener.

16. A tool comprising:
a main gear adapted to receive a torsional input;
a sector gear comprising a first end rotatably couplable to the main gear and a second end configured to engage with a fastener, the second end including a generally arcuate section including a plurality of teeth; and
a handle connected to the sector gear and including one or more springs,
wherein the sector gear can be uncoupled from the main gear by overcoming a bias in the one or more springs so the sector gear can be rotatable relative to the main gear, and wherein when the sector gear is uncoupled from the main gear it is not engageable with the fastener, and
wherein the handle is configured to:
uncouple the sector gear from the main gear,
rotate the sector gear relative to the main gear and the fastener, and
reengage the sector gear with the main gear.

17. The tool of claim 16, wherein the handle is adapted to move the sector gear out of rotatable coupling with the main gear.

18. The tool of claim 16, wherein the handle includes:
a pair of spaced apart pins connected to the sector gear, the pins projecting from the sector gear to a pair of spaced apart distal ends disposed outside the housing and a handle bar connected to the distal ends of the pins.

* * * * *